United States Patent
Liu et al.

(10) Patent No.: US 8,937,784 B1
(45) Date of Patent: Jan. 20, 2015

(54) DISK DRIVE EMPLOYING FEED-FORWARD COMPENSATION AND PHASE SHIFT COMPENSATION DURING SEEK SETTLING

(75) Inventors: Kexiu Liu, Foothill Ranch, CA (US); Orhan Beker, Dove Canyon, CA (US); Mingji Lou, Corona, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 54 days.

(21) Appl. No.: 13/564,653

(22) Filed: Aug. 1, 2012

(51) Int. Cl.
*G11B 21/02* (2006.01)

(52) U.S. Cl.
USPC .......................................... 360/75; 360/78.04

(58) Field of Classification Search
USPC ........................... 360/75, 78.07, 78.06, 78.09
See application file for complete search history.

(56) References Cited

U.S. PATENT DOCUMENTS

| | | | |
|---|---|---|---|
| 5,793,558 A | 8/1998 | Codilian et al. |
| 6,013,995 A | 1/2000 | Kim |
| 6,014,283 A | 1/2000 | Codilian et al. |
| 6,031,684 A | 2/2000 | Gregg |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |

(Continued)

OTHER PUBLICATIONS

Yang Quan Chen, Kevin L. Moore, Jie Yu, Tao Zhang, "Iterative Learning Control and Repetitive Control in Hard Disk Drive Industry—A Tutorial", Proceedings 2006 IEEE Conference on Decision and Control, San Diego, CA, Dec. 2006, 14 pages.

(Continued)

*Primary Examiner* — Tan X Dinh

(57) ABSTRACT

A method of operating a disk drive is disclosed wherein the disk drive comprises a disk comprising a plurality of tracks, a head, and a closed loop servo system comprising a seek servo loop and a settle servo loop for actuating the head over the disk. When the head approaches a target track during a seek operation, the settle servo loop is enabled wherein a feedback control signal is generated based on a measured state of the servo system. The feedback control signal is adjusted with a feed-forward compensation. A phase shift between the measured state of the servo system and a corresponding estimated state of the servo system is compensated. The head is settled on the target track in response to the feed-forward compensation.

24 Claims, 5 Drawing Sheets

(56) References Cited

U.S. PATENT DOCUMENTS

| | | |
|---|---|---|
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,490,120 B1 | 12/2002 | Burton et al. |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,501,613 B1 | 12/2002 | Shih |
| 6,504,670 B1 | 1/2003 | Dittmar |
| 6,507,450 B1 | 1/2003 | Elliott |
| 6,510,016 B1* | 1/2003 | Hattori ............... 360/77.02 |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,563,663 B1 | 5/2003 | Bi et al. |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,686,716 B1 | 2/2004 | Predina et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,781,787 B1 | 8/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,170,581 B2 | 1/2007 | Tousain |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,206,162 B2 | 4/2007 | Semba et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,394,614 B2 | 7/2008 | Kang |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |

(56) References Cited

U.S. PATENT DOCUMENTS

| | | |
|---|---|---|
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 2002/0006010 A1 | 1/2002 | Ding et al. |
| 2003/0058571 A1* | 3/2003 | Kisaka ............ 360/78.04 |
| 2004/0036999 A1* | 2/2004 | Chrappan Soldavini et al. ............ 360/78.04 |
| 2006/0007592 A1 | 1/2006 | Takaishi et al. |
| 2006/0082922 A1 | 4/2006 | Shih |

(56) References Cited

U.S. PATENT DOCUMENTS

| | | |
|---|---|---|
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0229135 A1* | 9/2013 | Long et al. ............... 318/400.34 |
| 2013/0231891 A1* | 9/2013 | Long et al. ................... 702/145 |

OTHER PUBLICATIONS

Mingxuan Sun, Danwei Wang, "Closed-loop iterative learning control for non-linear systems with initial shifts", International Journal of Adaptive Control Signal Process, 16 (7), 2002, 515-538, 24 pages, Feb. 14, 2002.

Douglas A. Bristow, Marina Tharayil, Andrew G. Alleyne, "A Survey of Iterative Learning Control a learning-based method for high-performance tracking control", IEEE Control Systems Magazine, 2006, vol. 26: pp. 96-114, 19 pages, Jun. 2006.

F. L. Lewis, M. A. Christodoulou, B. G. Mertzois, "System Inversion using Orthogonal Functions*", Circuits Systems Signal Process, vol. 6, No. 3, 1987, 16 pages, Jan. 17, 1987.

Mingji Lou, et. al., U.S. Appl. No. 13/492,449, filed Jun. 8, 2012, 22 pages.

* cited by examiner

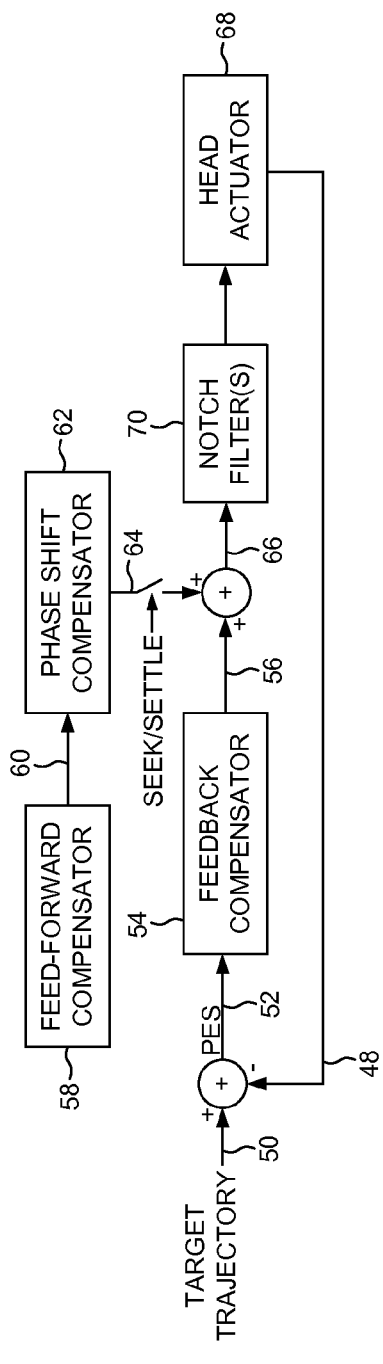
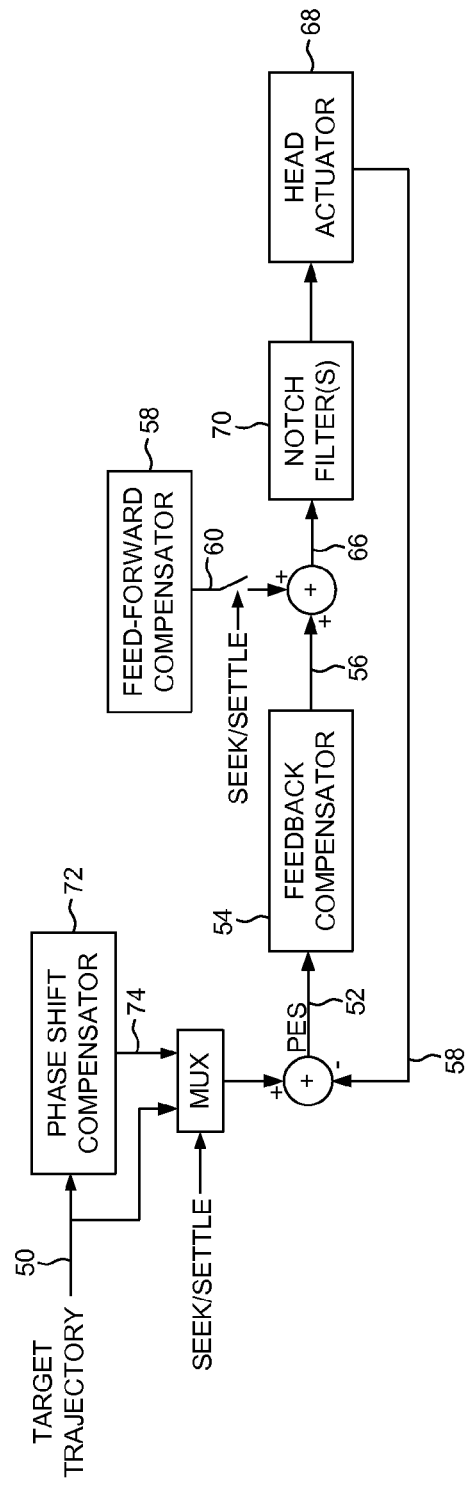
FIG. 3
FIG. 4

US 8,937,784 B1

DISK DRIVE EMPLOYING FEED-FORWARD COMPENSATION AND PHASE SHIFT COMPENSATION DURING SEEK SETTLING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 6 defined by servo sectors $4_0$-$4_N$ recorded around the circumference of each data track. Each servo sector 4, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 4, further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a servo track during write/read operations.

BRIEF DESCRIPTION OF THE DRAWINGS

FIG. 3 shows an embodiment of the present invention wherein the servo system compensates for a phase shift caused by one or more notch filters by generating feed-forward compensation in response to a phase lead.

FIG. 4 shows an embodiment of the present invention wherein a feedback control signal is generated in response to a phase lag according to an embodiment of the present invention.

DETAILED DESCRIPTION

Figure 2:
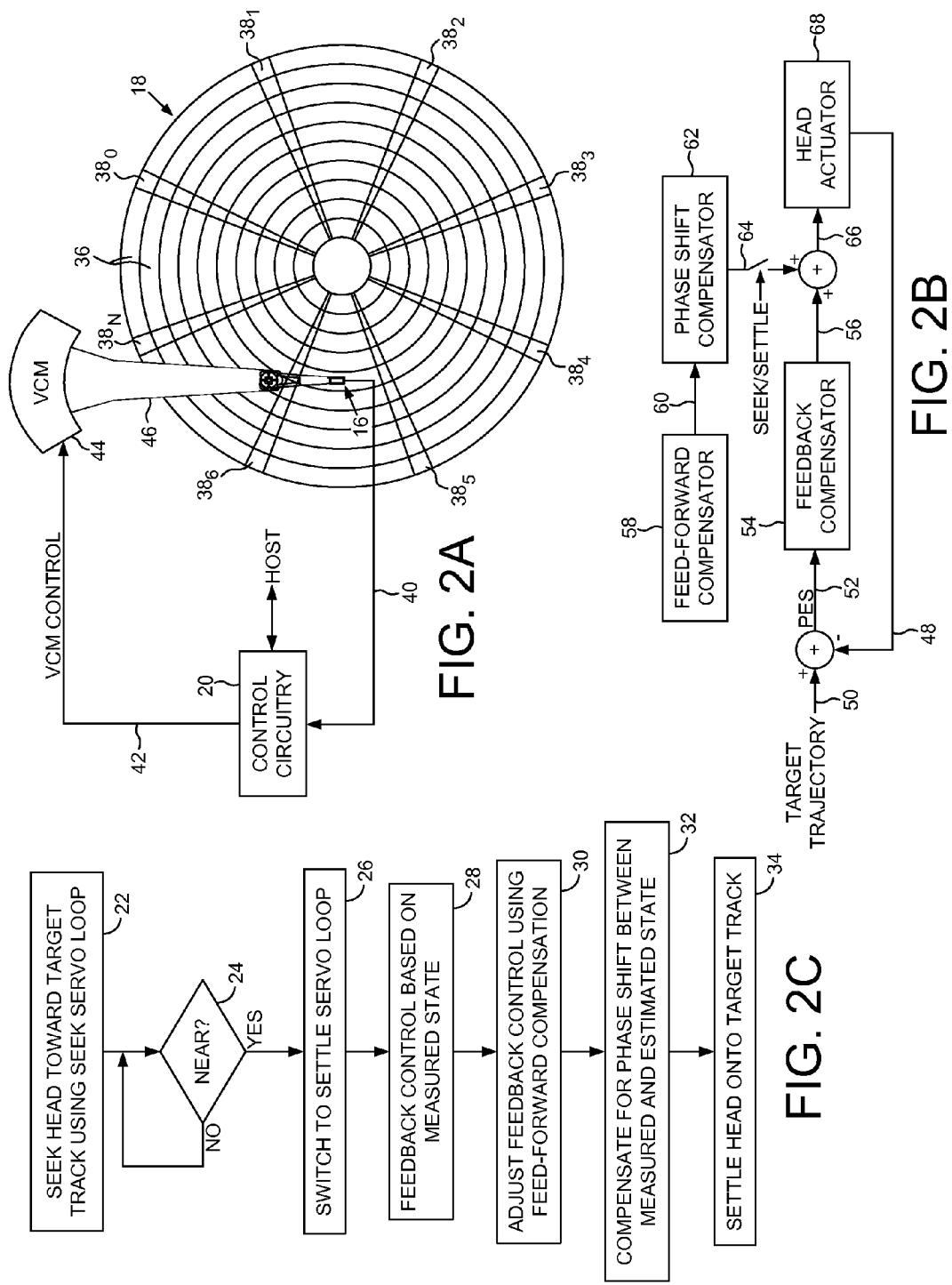
FIG. 2A shows a disk drive according to an embodiment of the present invention comprising a head actuated over a disk.
FIG. 2B shows a closed loop servo system for actuating the head over the disk according to an embodiment of the present invention.
FIG. 2C is a flow diagram according to an embodiment of the present invention wherein the servo system compensates for a phase shift between a measured and estimated servo system state.

FIG. 2A shows a disk drive comprising a head 16 actuated over a disk 18 comprising a plurality of tracks, and control 20 circuitry comprising a closed loop servo system comprising a seek servo loop and a settle servo loop (e.g., FIG. 2B). The control circuitry 20 is operable to execute the flow diagram shown in FIG. 2C, wherein the seek servo loop is used to seek the head toward a target track (block 22), and when the head approaches the target track (block 24), the control circuitry switches to the settle servo loop (block 26). A feedback control signal is generated based on a measured state of the servo system (block 28), and the feedback control signal is adjusted with a feed-forward compensation (block 30). A phase shift between the measured state of the servo system and a corresponding estimated state of the servo system is compensated (block 32), and the head is settled on the target track in response to the feed-forward compensation (block 34).

Figure 1:
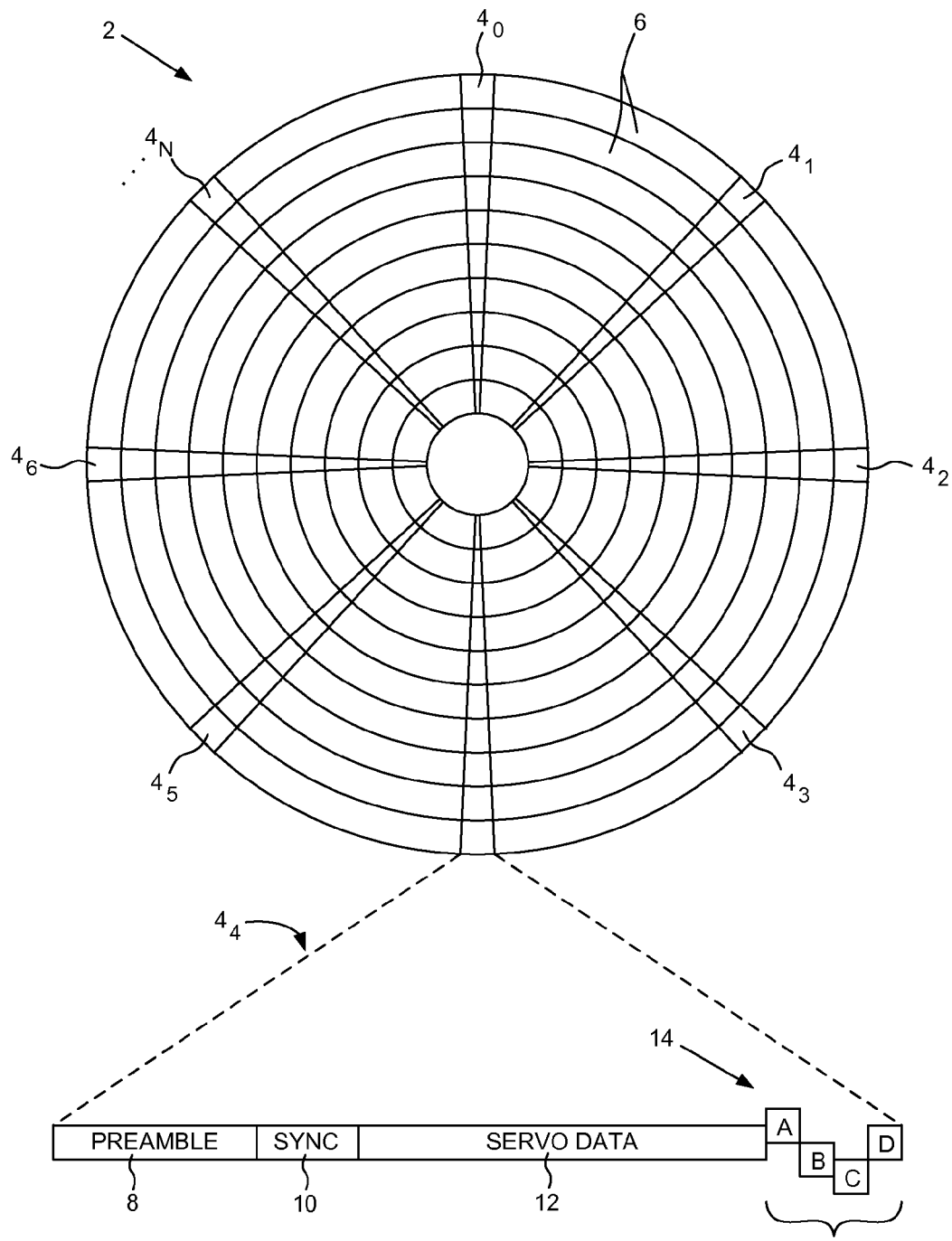
FIG. 1 shows a prior art disk format comprising a plurality of servo tracks defined by servo sectors.

In the embodiment of FIG. 2A, a plurality of concentric servo tracks 36 are defined by embedded servo sectors $38_0$-$38_N$, wherein a plurality of concentric data tracks are defined relative to the servo tracks 36. The control circuitry 20 processes a read signal 40 emanating from the head 16 to demodulate the servo sectors and generate a position error signal (PES) representing an error between the actual position of the head and a target position relative to a target track. The control circuitry 20 filters the PES using a suitable compensation filter to generate a control signal 42 applied to a voice coil motor (VCM) 44 which rotates an actuator arm 46 about a pivot in order to actuate the head 16 radially over the disk 18 in a direction that reduces the PES. The servo sectors may comprise any suitable head position information, such as a track address for coarse positioning and servo bursts for fine positioning. The servo bursts may comprise any suitable pattern, such as an amplitude based servo pattern (FIG. 1) or a phase based servo pattern.

FIG. 2B shows components of a closed loop servo system for actuating the head 16 over the disk 18 according to an embodiment of the present invention. A measured position 48 of the head 16 is generated from the position information recorded in the servo sectors $38_0$-$38_N$, wherein the measured position 48 is subtracted from an estimated position 50 of a target trajectory to generate a position error signal (PES) 52. A feedback compensator 54 processes the PES 52 to generate a feedback control signal 56. During the settle mode of a seek operation, a feed-forward compensator 58 generates feed-forward compensation 60 and a phase shift compensator 62 adjusts the feed-forward compensation 60 to compensate for a phase shift between the measured position 48 of the head and the corresponding estimated position 50 of the head. The feedback control signal 56 is adjusted by adding the phase adjusted feed-forward compensation 64 to generate a control signal 66 applied to a head actuator 68 (such as the VCM 44 of FIG. 2A).

In one embodiment, the phase shift between the measured servo state and the corresponding estimated servo state is predetermined based on a characteristic of the servo system. FIG. 3 shows an example of this embodiment wherein the closed loop servo system comprises one or more notch filters 70 (fixed and/or adaptive) that filter the control signal 66 in order to suppress resonances of the servo system. The notch filters 70 introduce a phase lag between the estimated position 50 of the head due to the feed-forward compensation 60 and the measured position of the head 48. In one embodiment, the head actuator 68 may also exhibit a phase lag that is additive to the phase lag of the notch filters 70. In order to compensate for this phase lag in the embodiment of FIG. 3, the phase shift compensator 62 induces a phase lead into the feed-forward compensation 60.

The phase lag induced by the notch filters 70 and/or the head actuator 68 may be estimated in any suitable manner. In one embodiment, the effect of the phase shift is measured at a specific frequency $W_c$. For the fixed notch filter phase shift, since the notch coefficients are known in advance, the phase shift of each notch filter can be calculated for each head. Assume for head i the phase lag of all the fixed notch filters together has a phase lag $\theta_{(i,fix)}$ at frequency $W_c$. For each adaptive notch filter, there are several profiles one of which is chosen depending on the process calibration for each disk drive. For the adaptive notch phase shift for head i a phase lag $\theta_{(j,k)}$ is calculated based on the calibrated adaptive notch filter profile j for each adaptive notch k, the sum of which corresponds to the total phase lag due to all adaptive notch filters for the head:

$$\theta_{(i,adaptive)} = \sum_{j,k} \theta_{j,k,i} \text{ at frequency } W_c.$$

For the head actuator 68 phase lag, the phase shift difference among different heads can be measured over multiple drives and a phase shift value can be specified for each head i as $\theta_{(i,ac)}$ at frequency $W_c$, where there may be a significant phase shift difference among inner heads and outer heads of the head stack assembly. At the beginning of each seek, the phase lag at $W_c$ for each head i is calculated as:

$$\theta_{(i)} = \theta_{(i,ac)} + \theta_{(i,fix)} + \theta_{(i,adaptive)}$$

In one embodiment, a scaled phase shift value is computed according to:

$$\tau_i = \frac{\theta_{(i)}}{W_c} * 2^{Q_{lag}}$$

where $\tau_i$ represents a phase lag if positive and phase lead if negative. At current time t, a new phase adjusted feed-forward compensation ACT_FF 64 is computed according to:

$$\text{ACT\_FF\_new}(t) = \frac{\tau_i * \text{ACT\_FF}(t-1) + (2^{Q_{lag}} - \tau_i) * \text{ACT\_FF}(t)}{2^{Q_{lag}}}$$

if $\tau_i \geq 0$ $$\text{ACT\_FF\_new}(t) = \frac{-\tau_i * \text{ACT\_FF}(t+1) + (2^{Q_{lag}} + \tau_i) * \text{ACT\_FF}(t)}{2^{Q_{lag}}}$$

if $\tau_i < 0$

FIG. 4 shows an alternative embodiment of the present invention wherein a phase shift compensator 72 induces a phase lag into the estimated position 50 of the head to compensate for the phase shift after switching to the settle servo loop. In effect, the phase shift compensator 72 shifts the target trajectory so that the estimated position 50 of the head is delayed to generate a phase shifted version 74 of the estimated position 50. Accordingly, in this embodiment the feedback control signal 56 is generated in response to the phase lag instead of adjusting the feed-forward compensation 60 with a phase lead as in FIG. 3.

Figure 5A:
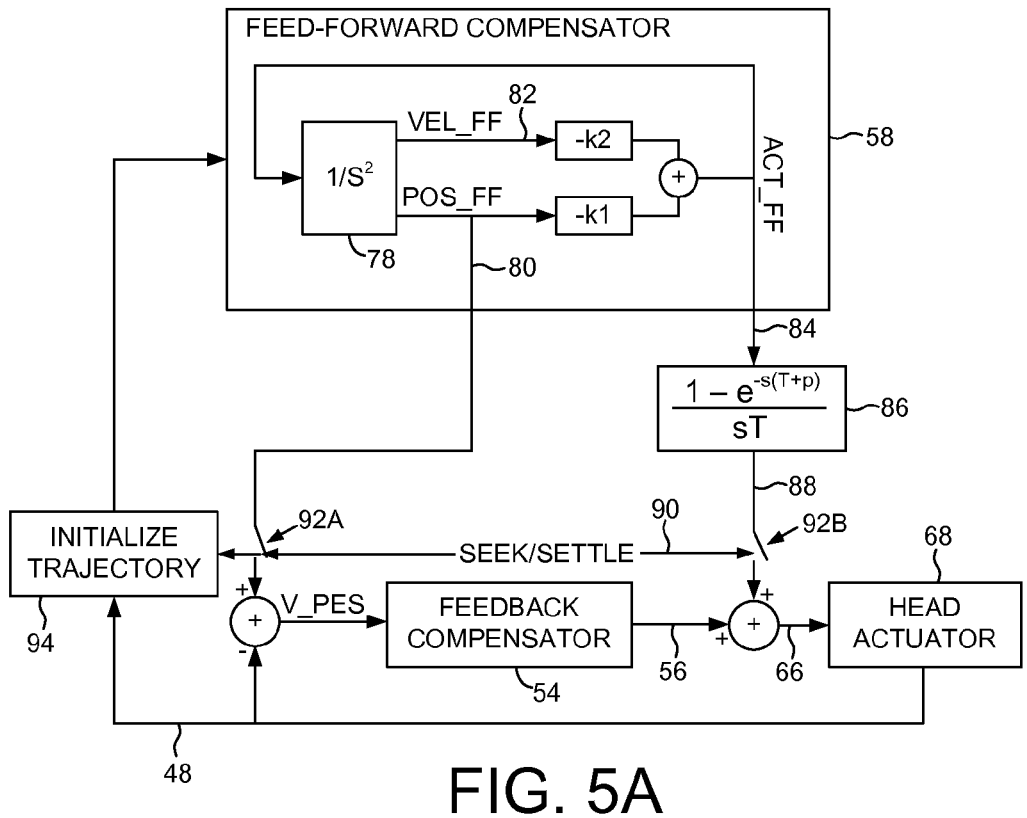
FIG. 5A shows an embodiment of the present invention wherein a model based feed-forward compensator operates according to a state trajectory, and the state trajectory is adjusted in response to the phase shift.

FIG. 5A shows an embodiment of the present invention wherein the feed-forward compensator 58 generates an estimated state based on a model 78 of the closed loop servo system. In the embodiment of FIG. 5A, the estimated state generated by the feed-forward compensator 58 comprises an estimated position 80 of the head relative to a target track, and an estimated velocity 82 of the head. The estimated states are multiplied by respective scalars −k1 and −k2, and the results summed to generate the feed-forward compensation 84. The estimated position 80 and the estimated velocity 82 of the head are initialized based on a measured state of the servo system at the beginning of the settle operation (when the head nears the target track during a seek operation). In one embodiment, the estimated states in the feed-forward compensator 58 are initialized based on a measured position 48 of the head (derived from reading the servo sectors $38_0$-$38_N$) and a measured velocity of the head (e.g., based on the derivative of the measured position 48). The scalars k1 and k2 are also initialized based on the measured state of the servo system in order to initialize a state trajectory of the feed-forward compensator 58. After initializing the estimated states and the scalars, the model 78 of the closed loop servo system will generate the feed-forward compensation 84 so that the estimated states (estimated position 80 and estimated velocity 82) follow the state trajectory, thereby causing the actual states of the servo system to substantially follow the state trajectory. In the embodiment of FIG. 5A, a phase shift compensator 86 adjusts the feed-forward compensation 84 to compensate for the phase shift between the measured position 48 of the head and the estimated position 80 as described above.

In the embodiment of FIG. 5A, a virtual position error signal (V_PES) is generated based on the difference between the estimated position 80 and the measured position 48 so that the feedback compensator 54 compensates for the error between the estimated and measured states (i.e., the target trajectory in FIG. 2B is generated by the model 78 in FIG. 5A as the estimated position 80).

In the embodiment of FIG. 5A, the model 78 of the closed loop servo system comprises a second order system (a double integrator) that can be normalized and represented by the following continuous time state space equation:

$$\begin{bmatrix} x_1(t) \\ x_2(t) \end{bmatrix} = \begin{bmatrix} 0 & 1 \\ 0 & 0 \end{bmatrix} \begin{bmatrix} x_1(t) \\ x_2(t) \end{bmatrix} + \begin{bmatrix} 0 \\ 1 \end{bmatrix} u(k-1)$$

$$y = \begin{bmatrix} 1 & 0 \end{bmatrix} \begin{bmatrix} x_1(t) \\ x_2(t) \end{bmatrix}$$

$y = x_1 : \text{PES}; x_2 : \text{VEL}$

The above continuous time state space equation can be transformed into a discrete-time representation:

$$\begin{bmatrix} x_1(k) \\ x_2(k) \end{bmatrix} = \begin{bmatrix} 1 & 1 \\ 0 & 1 \end{bmatrix} \begin{bmatrix} x_1(k-1) \\ x_2(k-1) \end{bmatrix} + \begin{bmatrix} 0.5 \\ 1.0 \end{bmatrix} u(k-1)$$

$$y = [\,1\quad 0\,]\begin{bmatrix} x_1(k-1) \\ x_2(k-1) \end{bmatrix}$$

$y = x_1$:PES; $x_2$:VEL

Assuming the feedback for the above internal model is:

$$u(k) = -[\,k1\quad k2\,]\begin{bmatrix} x_1(k-1) \\ x_2(k-1) \end{bmatrix}$$

then the model can be rewritten as:

$$\begin{bmatrix} x_1(k) \\ x_2(k) \end{bmatrix} = \begin{bmatrix} 1-0.5\cdot k1 & 1-0.5\cdot k2 \\ -k1 & 1-k2 \end{bmatrix}\begin{bmatrix} x_1(k-1) \\ x_2(k-1) \end{bmatrix}$$

Figure 5B:
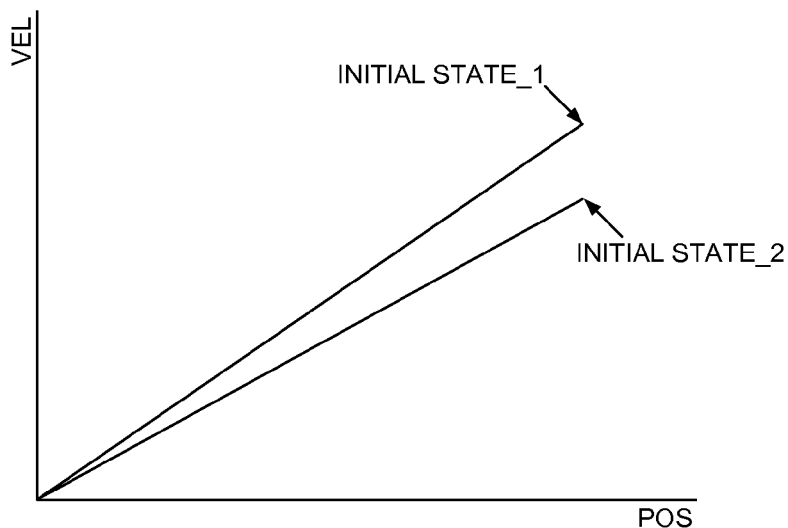
FIG. 5B illustrates different state trajectories based on a different initial state of the servo system prior to switching to a settle servo loop according to an embodiment of the present invention.

If the state trajectory of the feed-forward compensator 58 is a straight line approaching in the phase plane (VEL vs POS) as shown in FIG. 5B, then the above equation simplifies to k1=0, k2=R=VEL(0)/POS(0), where POS(0) represents the measured position 48 and VEL(0) represents the measured velocity of the head at the beginning of the settle operation (when the head nears the target track during a seek operation) and the scalar k2 represents the slope (R) of the straight line. As shown in FIG. 5B, the slope of the linear trajectory will vary based on the measured position and velocity at the beginning of the settle operation.

Referring again to the embodiment shown in FIG. 5A, at the beginning of the settle operation a control signal 90 closes switches 92A and 92B to enable generation of the V_PES and to enable the feed-forward compensation 88. The control signal 90 also signals block 94 to initialize the estimated states (POS_FF and VEL_FF) based on the measured states (e.g., the measured position 48 of the head) as well as initialize the scalars k1 and k2 (such as initializing k2 to establish the slope of the above-described linear trajectory).

In the embodiment of FIG. 5A, the feed-forward compensator 58 generates estimated states for the position 80 and velocity 82 of the head. In other embodiments, the feed-forward compensator 58 may generate other states, or additional states such as acceleration or jerk. The feed-forward compensator 58 may also comprise a more sophisticated model 78 and/or a more sophisticated state trajectory (other than the above-described linear trajectory).

Referring again to the above discrete-time representation of the servo system, when the state trajectory of the feed-forward compensator 58 is a straight line in the phase plane (VEL vs POS) as shown in FIG. 5B, and when the phase shift is taken into account, the above equation may be represented as:

$$\begin{bmatrix} x_1(k) \\ x_2(k) \end{bmatrix} = \begin{bmatrix} 1 & 1-p*\overline{R} \\ 0 & 1-\overline{R} \end{bmatrix}\begin{bmatrix} x_1(k-1) \\ x_2(k-1) \end{bmatrix}$$

$u(k) = -\overline{R}x_2(k-1)$ where p represents the phase shift, and the phase shift p is used to modify the slope R to generated a modified slope $\overline{R}$ that accounts for the phase shift p. The approaching slope in terms of VEL and PES at each servo wedge is:

$$R = \frac{V(k-1)}{PES(k-1)}.$$

The approaching slope in terms of the average VEL is:

$$\overline{R} = \frac{\overline{V}(k-1)}{PES(k-1)}.$$

The VEL at the next servo wedge can be calculated as:

$V(k) = V(k-1) - R\cdot V(k-1)$ $\lim_{k\to\infty} V(k) = V(k-1) - \overline{R}\cdot V(k-1).$ The average VEL can be calculated as:

$\overline{V}(k) = (1-p)V(k-1) + pV(k).$

From the above equations:

$\overline{V}(k) = V(k-1) - p\overline{R}V(k-1)$ and $$\overline{R}(k) = \frac{V(k-1) - p\overline{R}V(k-1)}{PES(k-1)}.$$

Therefore the modified slope $\overline{R}$ of the state trajectory can be calculated as:

$$\overline{R}(k) = \frac{V(k-1)}{PES(k-1) + pV(k-1)}.$$

In one embodiment, the phase shift p between the measured position 48 of the head and the estimated position 80 may be computed dynamically based on the measured position and the measured velocity prior to switching to the settle servo loop. Consider that:

$PES(N)(1+\overline{R})^N = PES(0)$ then from the above equations:

$$PES(N)\left(1 + \frac{V(k-1)}{PES(k-1) + pV(k-1)}\right)^N = PES(0)$$

where PES(0) represents the PES prior to switching to the settle servo loop and PES(N) represents the PES at the end of the settle operation. Assuming that the modified slope $\overline{R}$ is fixed prior to switching to the settle servo loop, then:

$$PES(N)\left(1 + \frac{V(0)}{PES(0) + pV(0)}\right)^N = PES(0)$$

$$p = \frac{1}{\sqrt[N]{\frac{PES(0)}{PES(N)}} - 1} - \frac{PES(0)}{V(0)}.$$

In one embodiment, the phase shift p is modified to achieve a desired settle performance within a predetermined N number of servo sectors:

$$p = \frac{\frac{1}{\sqrt[N]{\frac{PES(0)}{PES(N)}} - 1} - \frac{PES(0)}{V(0)}}{\frac{1}{\sqrt[N]{\frac{PES(0)}{PES(N)}} - 1} - \frac{\overline{PES(0)}}{\overline{V(0)}}} \overline{p}$$

which can be simplified by substituting:

$$\sqrt[N]{\frac{PES(0)}{PES(N)}} \approx \sqrt[N]{\frac{\overline{PES(0)}}{\overline{PES(N)}}}$$

such that:

$$p \approx \frac{delt - \frac{PES(0)}{V(0)}}{delt - \frac{\overline{PES(0)}}{\overline{V(0)}}} \overline{p}$$

where:

$$delt = \frac{1}{\sqrt[N]{\frac{\overline{PES(0)}}{\overline{PES(N)}}} - 1}$$

$\overline{p}$ is a nominal phase shift;
PES(0) represents a measured position of the head prior to switching to the settle servo loop;
V(0) represents a measured velocity of the head prior to switching to the settle servo loop;
$\overline{PES(0)}$ represents a nominal position of the head prior to switching to the settle servo loop;
$\overline{V(0)}$ represents a nominal velocity of the head prior to switching to the settle servo loop;
N represents a nominal time (number of servo sectors) to settle the head on the target track; and
$\overline{PES(N)}$ represents a nominal position of the head at time N.

In one embodiment, after estimating the phase shift p based on the measured position and the measured velocity prior to switching to the settle servo loop as described above, the modified slope $\overline{R}$ of the state trajectory may be calculated using the above equation in response to the estimated phase shift p.

In another embodiment of the present invention, the phase shift p may be computed based on the measured servo states after switching to the settle servo loop and while settling the head on the target track in response to the feed-forward compensation. That is, the phase shift p may be updated at each servo sector after switching to the settle servo loop. In one embodiment, the phase shift p may be estimated according to:

$$p(k)=T \cdot [\text{Vel\_est}(k-1)-\text{Delta\_PES}(k-1)]/[\text{Vel\_est}(k-1)-\text{Vel\_est}(k)]$$

where:
p(k) represents the phase shift at time k;
PES(k) represents the measured state comprising a measured position of the head at time k;
Delta_PES(k)=PES(k)−PES(k−1); and
Vel_est(k) represents an estimated velocity of the head at time k.

In the embodiment of FIG. 5A, the phase shift compensator 86 adjusts the feed-forward compensation 84 based on a phase shift p computed dynamically as a function of the measured servo system states as described above. In another embodiment, the feed-forward compensation 84 in FIG. 5A may be further adjusted based on a predetermined phase shift, such as a predetermined phase shift caused by the notch filter(s) or the phase shift caused by the head actuator 68. In this embodiment, the phase shift p computed dynamically may compensate for an error in estimating the predetermined phase shift as well as other sources of phase shift.

Figure 6:
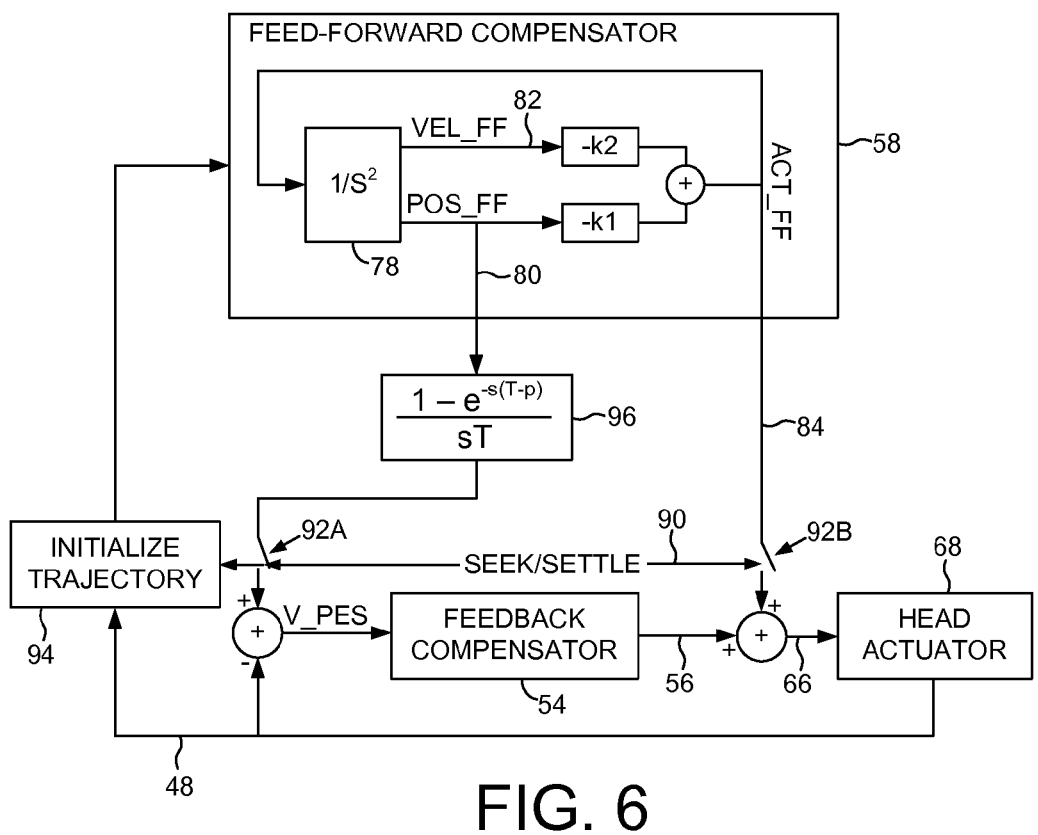
FIG. 6 shows an embodiment of the present invention wherein the position error signal generated by the model based feed-forward compensator is adjusted by a phase lag in order to compensate for the phase shift between the measured and estimated servo system state.

The phase shift compensator 86 in the embodiment of FIG. 5A adjusts the feed-forward compensation 84 by inducing a phase lead (i.e., the phase shift p is positive). In another embodiment shown in FIG. 6, a phase shift compensator 96 may adjust the estimated position 80 of the head by inducing a phase lag (i.e., the phase shift p is negative). In both embodiments, compensating for the phase shift between the measured position of the head 48 and the corresponding estimated position 80 of the head improves performance of the feed-forward compensator 58.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of operating a disk drive, the disk drive comprising a disk comprising a plurality of tracks, a head, and a closed loop servo system comprising a seek servo loop and a settle servo loop for actuating the head over the disk, the method comprising:
   seeking the head toward a target track using the seek servo loop; and
   when the head approaches the target track:
      switching to the settle servo loop;
      generating a feedback control signal based on a measured state of the servo system;

adjusting the feedback control signal with a feed-forward compensation to generate an adjusted feedback control signal;
compensating for a phase shift between the measured state of the servo system and a corresponding estimated state of the servo system; and
settling the head on the target track in response to the adjusted feedback control signal.

2. The method as recited in claim 1, wherein the measured state of the servo system comprises a measured position of the head relative to the target track.

3. The method as recited in claim 1, wherein compensating for the phase shift comprises generating the feed-forward compensation in response to a phase lead.

4. The method as recited in claim 1, wherein compensating for the phase shift comprises generating the feedback control signal in response to a phase lag.

5. The method as recited in claim 1, wherein the phase shift is estimated based on a characteristic of the servo system.

6. The method as recited in claim 5, wherein the characteristic of the servo system comprises a characteristic of a notch filter.

7. The method as recited in claim 5, wherein the characteristic of the servo system comprises a characteristic of an actuator operable to actuate the head over the disk.

8. The method as recited in claim 1, wherein the phase shift is estimated based on the measured state prior to switching to the settle servo loop.

9. The method as recited in claim 8, further comprising estimating the phase shift according to:

$$p = \frac{delt - \frac{PES(0)}{V(0)}}{delt - \frac{\overline{PES(0)}}{\overline{V(0)}}} \overline{p}; \quad delt = \frac{1}{\sqrt[N]{\frac{\overline{PES(0)}}{\overline{PES(N)}} - 1}}$$

where:
p is the phase shift;
$\overline{p}$ is a nominal phase shift;
PES(0) represents a measured position of the head prior to switching to the settle servo loop;
V(0) represents a measured velocity of the head prior to switching to the settle servo loop;
$\overline{PES(0)}$ represents a nominal position of the head prior to switching to the settle servo loop;
$\overline{V(0)}$ represents a nominal velocity of the head prior to switching to the settle servo loop;
N represents a nominal time to settle the head on the target track; and
$\overline{PES(N)}$ represents a nominal position of the head at time N.

10. The method as recited in claim 1, wherein the phase shift is estimated based on the measured state after switching to the settle servo loop and while settling the head on the target track in response to the feed-forward compensation.

11. The method as recited in claim 10, further comprising estimating the phase shift according to:

p(k)=T·[Vel_est(k−1)−Delta_PES(k−1)]/[Vel_est(k−1)−Vel_est(k)]

where:
p(k) represents the phase shift at time k;
PES(k) represents the measured state comprising a measured position of the head at time k;
Delta_PES(k)=PES(k)−PES(k−1); and
Vel_est(k) represents an estimated velocity of the head at time k.

12. The method as recited in claim 1, further comprising:
generating the feed-forward compensation based on a state trajectory; and
adjusting a state trajectory in response to the phase shift.

13. A disk drive comprising a disk comprising a plurality of tracks, and control circuitry comprising a closed loop servo system comprising a seek servo loop and a settle servo loop for actuating a head over the disk, the control circuitry operable to:
seek the head toward a target track using the seek servo loop; and
when the head approaches the target track:
switch to the settle servo loop;
generate a feedback control signal based on a measured state of the servo system;
adjust the feedback control signal with a feed-forward compensation to generate an adjusted feedback control signal;
compensate for a phase shift between the measured state of the servo system and a corresponding estimated state of the servo system; and
settle the head on the target track in response to the adjusted feedback control signal.

14. The disk drive as recited in claim 13, wherein the measured state of the servo system comprises a measured position of the head relative to the target track.

15. The disk drive as recited in claim 13, wherein the control circuitry is operable to compensate for the phase shift by generating the feed-forward compensation in response to a phase lead.

16. The disk drive as recited in claim 13, wherein the control circuitry is operable to compensate for the phase shift by generating the feedback control signal in response to a phase lag.

17. The disk drive as recited in claim 13, wherein the control circuitry is operable to estimate the phase shift based on a characteristic of the servo system.

18. The disk drive as recited in claim 17, wherein the characteristic of the servo system comprises a characteristic of a notch filter.

19. The disk drive as recited in claim 17, wherein the characteristic of the servo system comprises a characteristic of an actuator operable to actuate the head over the disk.

20. The disk drive as recited in claim 13, wherein the control circuitry is operable to estimate the phase shift based on the measured state prior to switching to the settle servo loop.

21. The disk drive as recited in claim 20, wherein the control circuitry is operable to estimate the phase shift according to:

$$p = \frac{delt - \frac{PES(0)}{V(0)}}{delt - \frac{\overline{PES(0)}}{\overline{V(0)}}} \overline{p}; \quad delt = \frac{1}{\sqrt[N]{\frac{\overline{PES(0)}}{\overline{PES(N)}} - 1}}$$

where:
p is the phase shift;
$\overline{p}$ is a nominal phase shift;
PES(0) represents a measured position of the head prior to switching to the settle servo loop;

V(0) represents a measured velocity of the head prior to switching to the settle servo loop;

$\overline{PES(0)}$ represents a nominal position of the head prior to switching to the settle servo loop;

$\overline{V(0)}$ represents a nominal velocity of the head prior to switching to the settle servo loop;

N represents a nominal time to settle the head on the target track; and $\overline{PES(N)}$ represents a nominal position of the head at time N.

22. The disk drive as recited in claim 13, wherein the control circuitry is operable to estimate the phase shift based on the measured state after switching to the settle servo loop and while settling the head on the target track in response to the feed-forward compensation.

23. The disk drive as recited in claim 22, wherein the control circuitry is operable to estimate the phase shift according to:

$$p(k)=T \cdot [Vel\_est(k-1) - Delta\_PES(k-1)] / [Vel\_est(k-1) - Vel\_est(k)]$$

where:

p(k) represents the phase shift at time k;

PES(k) represents the measured state comprising a measured position of the head at time k;

Delta_PES(k)=PES(k)−PES(k−1); and

Vel_est(k) represents an estimated velocity of the head at time k.

24. The disk drive as recited in claim 13, wherein the control circuitry is further operable to:

generate the feed-forward compensation based on a state trajectory; and adjust a state trajectory in response to the phase shift.

* * * * *